United States Patent
Kuribayashi

(12) 
(10) Patent No.: US 6,930,672 B1
(45) Date of Patent: Aug. 16, 2005

(54) INPUT PROCESSING METHOD AND INPUT CONTROL APPARATUS

(75) Inventor: Tsuyoshi Kuribayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/290,419

(22) Filed: Apr. 13, 1999

(30) Foreign Application Priority Data

Oct. 19, 1998 (JP) .................................. 10-297046

(51) Int. Cl.$^7$ ............................................. G09G 5/00
(52) U.S. Cl. ..................... 345/173; 345/179; 345/163; 178/18.01; 178/20.01
(58) Field of Search ................................ 345/173, 174, 345/179, 163; 178/19.01, 19.03, 19.04, 19.05, 178/18.01, 18.03, 18.06, 18.07, 18.04

(56) References Cited

U.S. PATENT DOCUMENTS

| | | | | |
|---|---|---|---|---|
| 4,040,010 A | * | 8/1977 | Crane et al. ................ | 382/121 |
| 4,866,646 A | * | 9/1989 | Nakamura et al. .......... | 708/141 |
| 5,561,447 A | * | 10/1996 | Suzuki et al. ............... | 345/179 |
| 5,572,651 A | * | 11/1996 | Weber et al. ................ | 395/155 |
| 5,748,926 A | * | 5/1998 | Fukuda et al. .............. | 395/326 |
| 5,880,411 A | * | 3/1999 | Gillespie et al. .......... | 178/18.01 |
| 5,956,021 A | * | 9/1999 | Kubota et al. .............. | 345/179 |
| 5,959,615 A | * | 9/1999 | Yamade et al. ............. | 345/173 |
| 6,057,830 A | * | 5/2000 | Chan et al. .................. | 345/157 |
| 6,097,392 A | * | 8/2000 | Leyerle ....................... | 345/358 |
| 6,100,876 A | * | 8/2000 | Tanaka ........................ | 345/173 |
| 6,333,994 B1 | * | 12/2001 | Perrone et al. ............. | 382/186 |

FOREIGN PATENT DOCUMENTS

| | | |
|---|---|---|
| JP | 62-224820 | 10/1987 |
| JP | 4-360230 | 12/1992 |
| JP | 5-119946 | 5/1993 |
| JP | 6-161650 | 6/1994 |
| JP | 7-85032 | 3/1995 |
| JP | 408314606 A | * 11/1996 |

* cited by examiner

Primary Examiner—Guy J. Lamarre
Assistant Examiner—Fritz Alphonse
(74) Attorney, Agent, or Firm—Westerman, Hattori, Daniels & Adrian, LLP

(57) ABSTRACT

An input processing method and input control apparatus that enable switching between normal operation and hovering operation to be accomplished with a very simple operation in an information processing apparatus that uses a touch input device such as a tablet or the like as an input device. During a period that an improved hovering mode according to the present invention is set active, the time interval between a pen up motion and a subsequent pen down motion is detected. If the time interval is equal to or longer than a predetermined length of time, pen down information to be sent to the OS is set OFF, thereby effecting the hovering operation. On the other hand, if the time interval is shorter than the predetermined length of time, the pen down information to be sent to the OS is set ON, thereby effecting the normal operation. Thus, in the improved hovering mode, with an extra tap of a pen, the immediately following pen operation works as if it were performed in normal mode.

26 Claims, 17 Drawing Sheets

Fig.11

| CASE | | STEPS CARRIED OUT | PEN DOWN STATE FLAG | PEN DOWN STATE START FLAG | PEN DOWN STATE END FLAG | IMPROVED HOVERING MODE FLAG |
|---|---|---|---|---|---|---|
| (A) | PEN DOWN STATE IS FIRST ENTERED | 102,104, 108,110, 112 | 1 | 1 | 0 | 1 |
| (B) | DURING PEN DOWN STATE | LOOP OF 114,116, 110,112 | 1 | 0 | 0 | 1 |
| (C) | PEN UP IS DETECTED | 114,118 | 0 | 0 | 1 | 1 |

Fig.13

| CASE | | PEN DOWN STATE BIT | PEN DOWN STATE START BIT | PEN DOWN STATE END BIT | HOVERING VALID FLAG | STEPS CARRIED OUT | HOVERING VALID FLAG AFTER COMPLETION OF PROCESSING | PEN DOWN STATE BIT AFTER COMPLETION OF PROCESSING |
|---|---|---|---|---|---|---|---|---|
| (A) | FINAL STATUS IS RECEIVED | 0 | 0 | 1 | – | 202,204,206, 208 | – | – |
| (B) | FIRST STATUS IS RECEIVED WITH TIMER=0 | 1 | 1 | 0 | – | 202,204,206, 210,212,214, 216,224 | 1 | 0 |
| (C) | INTERMEDIATE STATUS IS RECEIVED FOLLOWING (B) | 1 | 0 | 0 | 1 | 202,204,206, 210,220,222, 224 | 1 | 0 |
| (D) | FIRST STATUS RECEIVED WITH TIMER≠0 | 1 | 1 | 0 | – | 202,204,206, 210,212,218, 224 | 0 | 1 |
| (E) | INTERMEDIATE STATUS IS RECEIVED FOLLOWING (D) | 1 | 0 | 0 | 0 | 202,204,206, 210,220,224, | 0 | 1 |

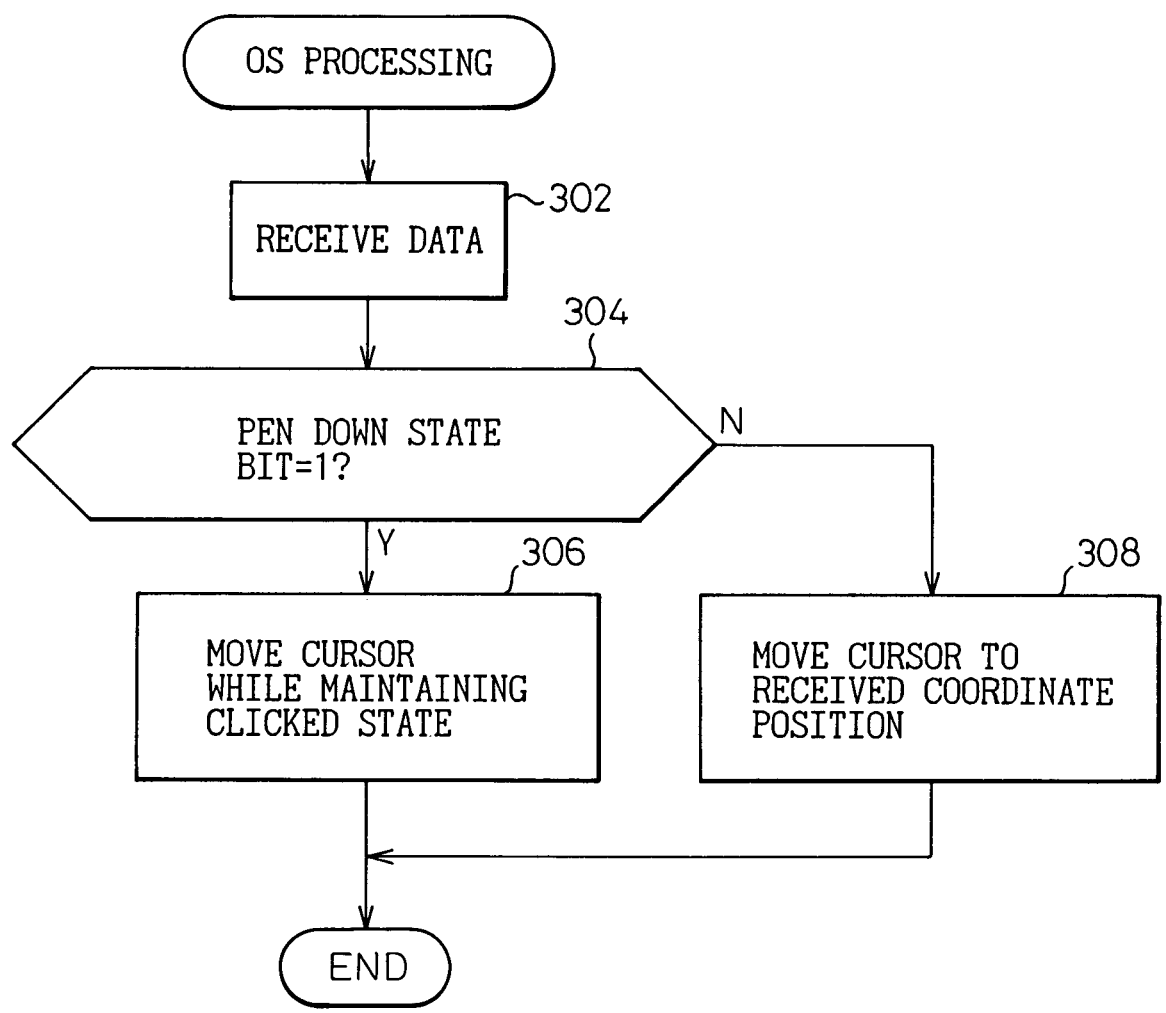

Fig.15A
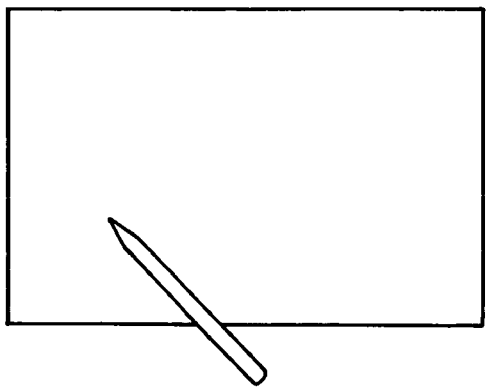
Fig.15B
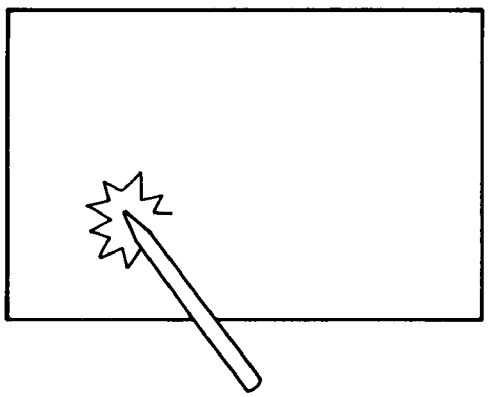
Fig.15C
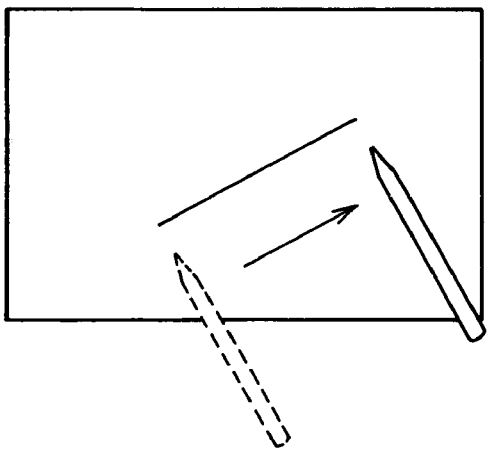

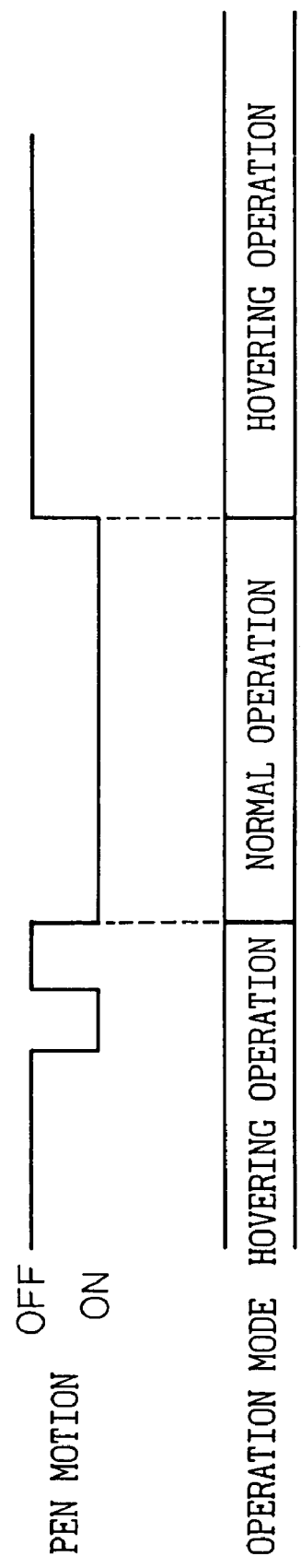

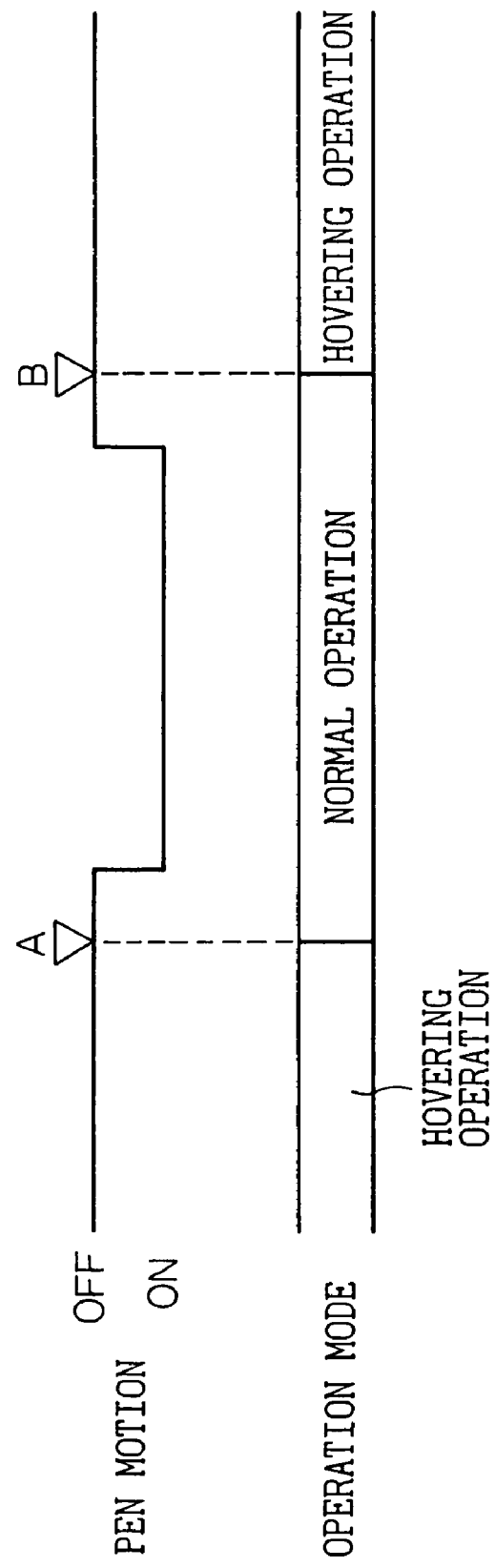

INPUT PROCESSING METHOD AND INPUT CONTROL APPARATUS

BACKGROUND OF THE INVENTION

1. Field of the Invention

The present invention relates to a method for processing input from a touch input device such as a tablet or the like used as an input device, and an input control apparatus for implementing the method.

2. Description of the Related Art

Portable information processing apparatuses, which are becoming popular, utilize touch input devices such as tablets or digitizers as input devices instead of mice. Generally, a tablet or digitizer is integrated with a display such as a liquid crystal display by being mounted as a transparent plate over the display or placed underneath the display, and is configured to detect the position of a stylus pen or the like on the display when the stylus pen or the like, as a pointing device, contacts the display screen.

Such input devices, generally called touch screens or touch panels, have been implemented in various ways, including one that uses a resistive film (pressure sensitive tablet) consisting of transparent electrodes bonded to the surface of a display (CRT, LCD, plasma display, etc.) and performs an input operation by touching the screen with a finger or a pen, and one that performs an input operation on the screen with the digitizer, mounted underneath the display, detecting the position of the input by detecting the magnetism being generated at the tip of the pen (when the pen is touched to the screen, magnetism is generated, and the position of the input is detected by the electromagnetic induction type digitizer mounted underneath the display). In addition to such pressure sensitive tablet and electromagnetic induction digitizer methods, various methods of input position detection have been implemented, such as an ultrasonic surface acoustic wave touch panel method that uses ultrasonic waves.

A tablet, like a mouse, is also used to specify a position in a graphical input operation, select a menu or activate a software program by manipulating an icon, and so on.

A mouse contains mouse buttons, and a mouse operation to press and release a mouse button is called a mouse click, the mouse operation being classified as a single click, double click, etc. according to how many times the button is pressed in succession. By putting the mouse cursor on a designated icon and clicking the mouse on it, desired processing can be specified. In the case of a pen operation on a tablet, if an operation to touch the pen or the like to the tablet (called a pen down motion) and then lift it off the tablet (called a pen up motion) is called a tap, then moving the mouse cursor and single-clicking or double-clicking the mouse corresponds to performing a single tap or double tap on a designated icon. The pen down and pen up motions here embrace operations performed not only by a pen but also by a finger or the like.

In a graphical input operation, when a tablet 10 is touched with a pen 14, as shown in FIG. 1, a dot is drawn on a display 12 at the position of the touch. The figure shows the tablet 10 and display 12 as a single integral unit. When the pen 14 is moved by holding it touched to the tablet 10, a line corresponding to its movement is drawn on the display 12.

In the case of a mouse, there is a mouse operation, called drag, in which the mouse is moved while keeping the mouse button pressed down; in a graphical input operation, a line is drawn when the mouse is dragged. On the other hand, when the mouse is moved without holding down a mouse button, the mouse cursor merely moves on the display.

In the case of a graphical input operation by a pen on a tablet, on the other hand, if a dot or line were always drawn with a pen down motion, an operation to move the cursor without drawing a dot or line, such as the operation shown in FIG. 3, could not be accomplished. To avoid this, an operation mode is provided in which even when the pen is actually touched to the tablet, the motion is not interpreted as a pen down motion but the mouse cursor is merely caused to move. This mode is called a hovering mode. To switch the operation between normal mode and hovering mode, a normal mode selection button 16 and a hovering mode selection button 18 are provided outside the display screen, as shown in FIG. 4. In an icon manipulation in the hovering mode, a pen tap on an icon only results in positioning the cursor on that icon.

In this way, an input operation on a touch input device such as a tablet or digitizer has required mode switching using the buttons provided outside the screen, and in the case of an input operation that requires frequent mode switching, the operation has been very tiring and inefficient for an operator.

SUMMARY OF THE INVENTION

The present invention has been devised in view of the above problem, and an object of the invention is to provide an input processing method and input control apparatus for a touch input device that enables operation mode switching to be accomplished with a very simple operation.

To achieve the above object, according to the present invention, there is provided an input processing method for a device which provides input by performing a touch motion on an operating surface, comprising: a first step of detecting the length of time of a non-touch state in which no touch motion is performed on the operating surface; and a second step of determining information indicating a touch state in accordance with the detected length of time when a touch motion has occurred.

According to the present invention, there is also provided an input processing method for a device which provides input by performing a touch motion on an operating surface, comprising: a first step of detecting the number of successive occurrences of the touch motion; and a second step of determining information indicating a touch state in accordance with the detected number of occurrences.

According to the present invention, there is also provided an input processing method for a device which provides input by performing a touch motion on an operating surface, comprising: a first step of detecting the number of occurrences of the touch motion over a predetermined length of time; and a second step of determining information indicating a touch state in accordance with the detected number of occurrences.

According to the present invention, there is also provided an input processing method for a device which provides input by performing a touch motion on an operating surface, comprising the steps of: detecting the number of successive occurrences of the touch motion; and determining a corresponding mouse operation in accordance with the detected number of occurrences.

Furthermore, according to the present invention, there are provided an input control apparatus for implementing the above method, and a program recording medium which is readable by a computer utilizing the input control apparatus, and on which is recorded a program for implementing the above method.

BRIEF DESCRIPTION OF THE DRAWINGS

Further features and advantages of the present invention will be apparent from the following description with reference to the accompanying drawings, in which:

FIG. 11 is a diagram for explaining the operation of the tablet controller;

FIG. 13 is a diagram for explaining the operation of the pen driver;

FIG. 14 is a flowchart illustrating a processing sequence of an OS during graphical input processing;

FIGS. 15A, 15B, and 15C are diagrams for explaining a method of operation mode switching according to the present invention;

FIG. 17 is a diagram for explaining pen motion and operation modes according to the present invention;

FIG. 18 is a diagram for explaining pen motion and operation modes according to the prior art;

DESCRIPTION OF THE PREFERRED EMBODIMENTS

An embodiment of the present invention will be described below with reference to the accompanying drawings. The embodiment hereinafter described deals with an example that uses a pen (or stylus), but the invention is also applicable to devices that are operated using fingers. For example, ultrasonic surface acoustic wave touch panels and pressure sensitive tablets permit position input by touching them with a finger without using a pen. The present invention does not exclude application to such devices.

Figure 1:
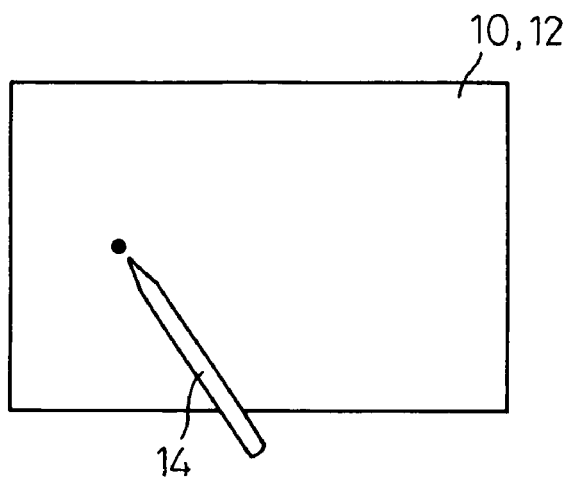
FIG. 1 is a diagram for explaining the motion for drawing a dot with a pen.
Figure 2:
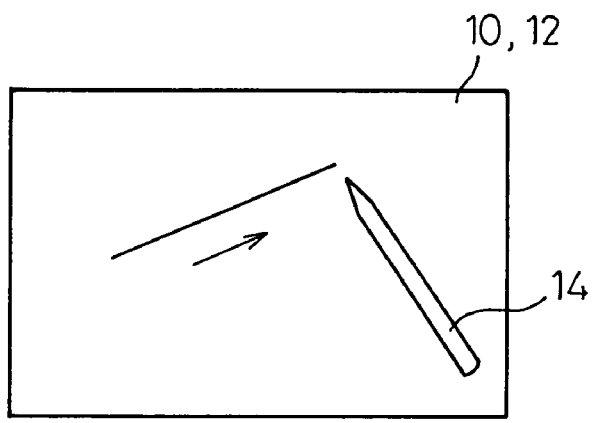
FIG. 2 is a diagram for explaining the motion for drawing a line with a pen.
Figure 3:
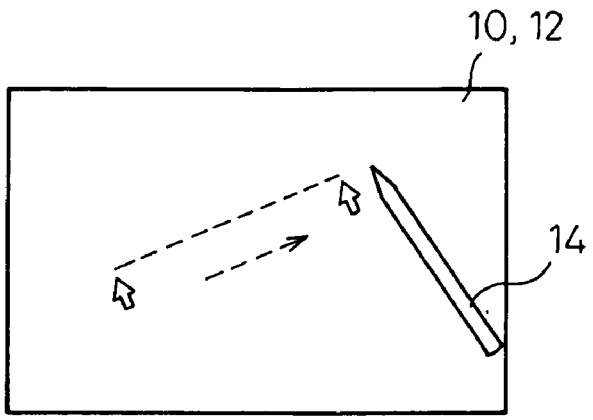
FIG. 3 is a diagram for explaining the motion for merely moving cursor coordinates without drawing a line.
Figure 4:
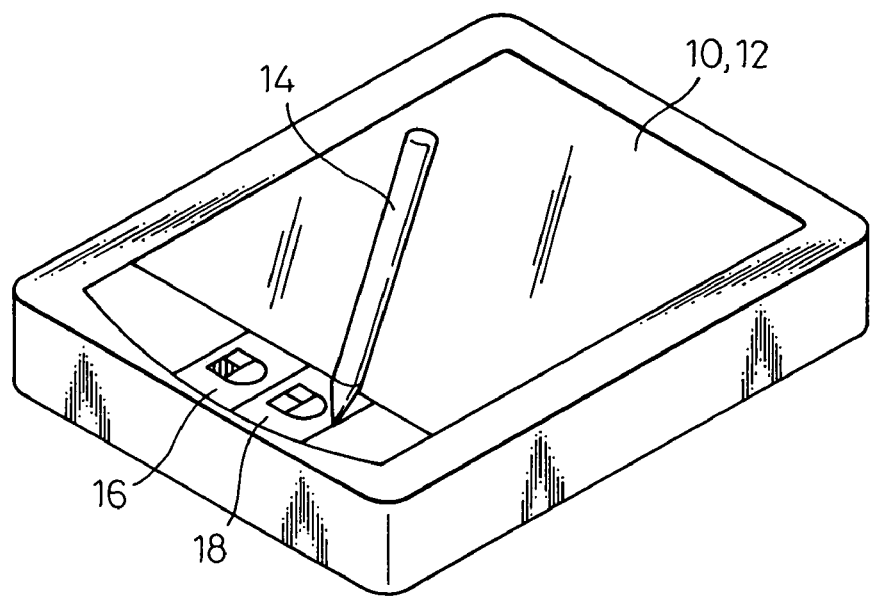
FIG. 4 is a diagram for explaining mode switching buttons according to the prior art.
Figure 5:
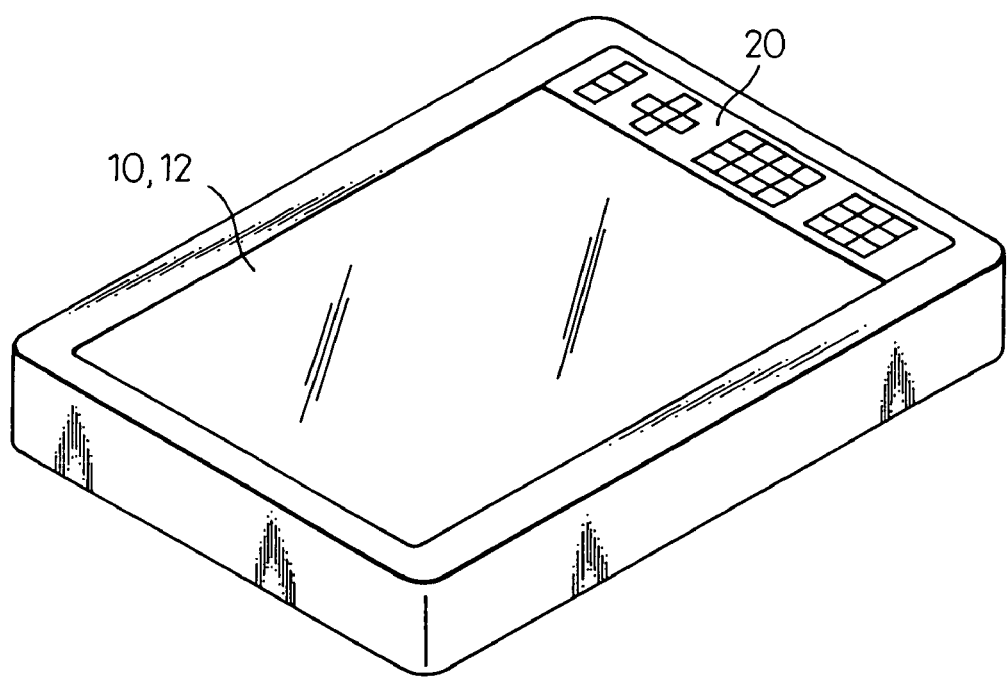
FIG. 5 is a perspective view of a portable information processing apparatus to which the present invention is applied.

FIG. 5 is a perspective view of a portable information processing apparatus to which the present invention is applied. A tablet 10 and a liquid crystal display 12 are combined together with one overlaid on top of the other, and function as electronic "paper". Various types of tablet 10 are commercially implemented, and the present invention is applicable to any type of tablet.

Figure 6A:
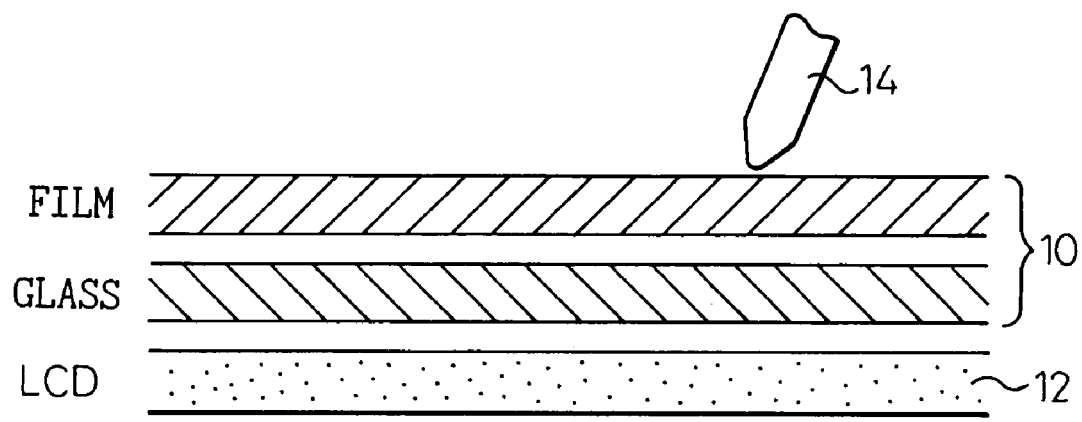
FIGS. 6A and 6B are diagrams for explaining a pressure sensitive tablet and an electromagnetic induction tablet, respectively, as representative examples of tablets.
Figure 6B:
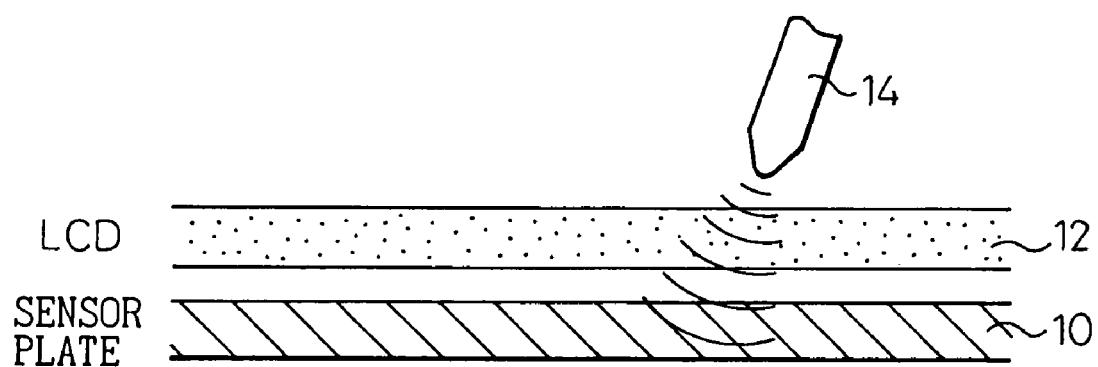

FIGS. 6A and 6B are diagrams for explaining a pressure sensitive tablet and an electromagnetic induction tablet, respectively, as representative examples of tablets. The pressure sensitive tablet 10 of FIG. 6A consists of a transparent film and glass, and is mounted over the liquid crystal display 12. When the film is brought into contact with the glass by being pressed with a pen or the like, there occurs a change in the resistance value, based on which the position where the contact is made is detected. The electromagnetic induction tablet 10 of FIG. 6B is constructed from a sensor plate containing a sensor coil, and is placed underneath the liquid crystal display 12. Pen position is determined by detecting the magnetism, generated from the tip of the pen, by means of the sensor coil.

Figure 7:
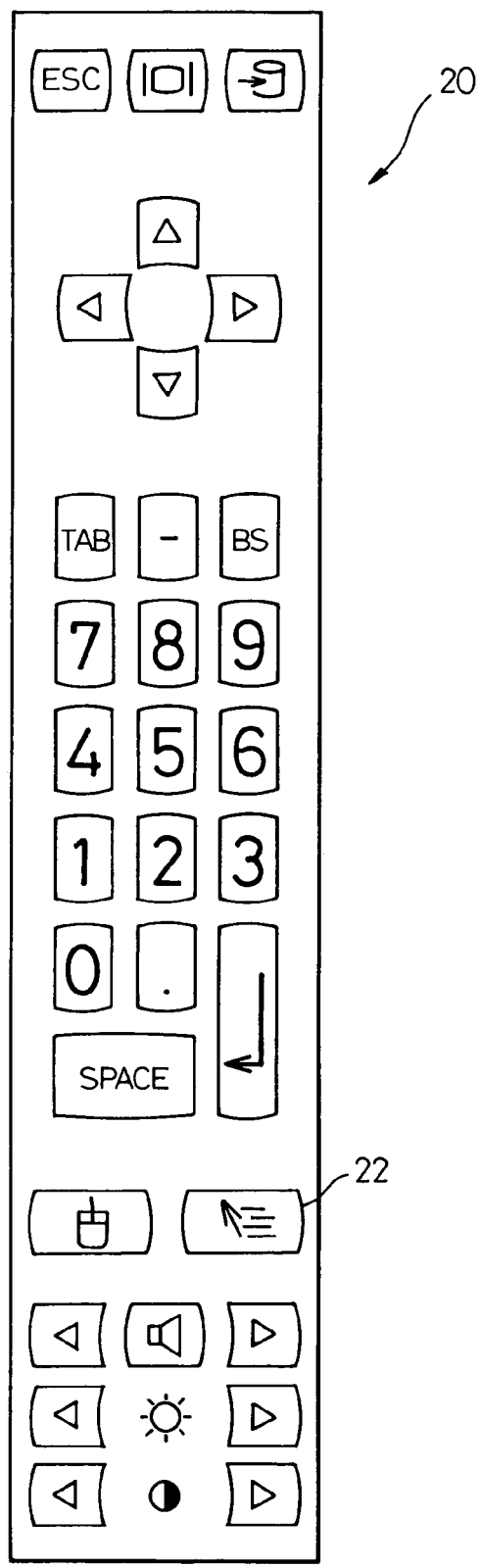
FIG. 7 is a diagram showing the details of a hot pad.

The details of a hot pad 20 in FIG. 5 are illustrated in FIG. 7. A hovering icon 22 on the hot pad 20 is an icon used for switching operation between the normal mode and an improved hovering mode according to the present invention. When the hovering icon 22 is touched during operation in the normal mode, the tablet 10 and display 12 operate in the improved hovering mode according to the present invention until this icon is touched again.

Figure 8:
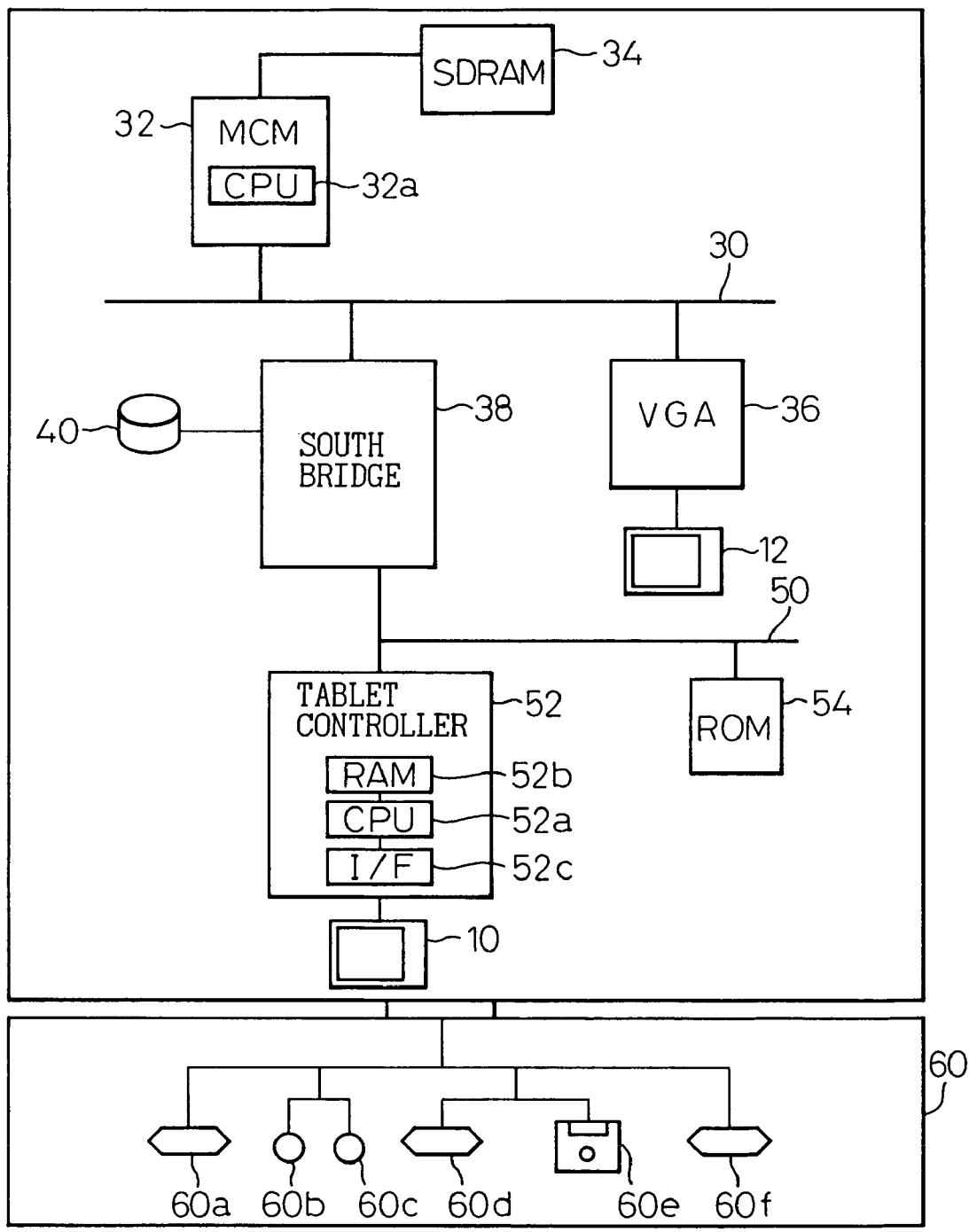
FIG. 8 is a block diagram showing the system configuration of the portable information processing apparatus shown in FIG. 5.

FIG. 8 is a block diagram showing the system configuration of the portable information processing apparatus (the so-called pen computer) shown in FIG. 5. A multichip module (MCM) 32, south bridge 38, and video graphics array (VGA) controller 36 are connected to a PCI (Peripheral Component Interconnect) bus 30. The south bridge 38, tablet controller 52, and ROM (read-only memory) 54 are connected to an ISA (Industry Standard Architecture) bus 50.

The multichip module 32 contains multiple bare silicon chips mounted on a small printed board, and comprises a CPU, a north bridge, and a secondary cache memory. The north bridge is a PCI system controller for controlling data transfers between the CPU, main memory, secondary cache memory, PCI bus, etc. A synchronous DRAM (SDRAM) 34 as the main memory is connected to the multichip module 32 via a memory bus. The SDRAM 34 is characterized by its operation synchronized to the system bus clock.

The VGA controller 36 controls the liquid crystal display 12 under the VGA standard. The south bridge 38 is a bridge, mounted with the PCI bus, that provides connections between the PCI bus and ISA bus on the motherboard, and controls data transfers between the CPU, memory, input/output devices, etc. A hard disk drive (HDD) 40 as an auxiliary storage device is connected to the south bridge 38.

The tablet controller 52 is responsible for controlling the processing of input from the tablet 10 and detecting an operation performed on the hot pad 20, and includes a CPU 52a, a memory (RAM) 52b, and an interface circuit 52c. The ROM 54 holds therein an initial program loader.

A port replicator 60, also called an expansion I/O box, connector box, expansion unit, or the like, is an adaptor which is connected to a notebook computer or a pen computer to enhance their expandability. Usually, it accommodates various connectors, such as a serial port 60d, a parallel port 60a, and a CRT connector 60f, as well as connection ports for a keyboard 60b, a mouse 60c, a floppy disk drive 60e, an Ethernet port, etc. Connectors that are infrequently used when the notebook computer or pen computer is taken on the road are accommodated in the port replicator.

In the present embodiment, the floppy disk drive 60e is connected via the port replicator 60, but the floppy disk drive may be connected directly to the pen computer, or alternatively, the pen computer itself may be constructed to contain a floppy disk. Further, the floppy disk drive may be incorporated in a docking station, rather than being connected via the port replicator. A docking station is a device that contains a SCSI card, an Ethernet card, a CD-ROM drive, a floppy disk drive, an additional PC card expansion bus, etc., and mostly is shaped so that a notebook computer can fit into it.

Programs may be provided using the CD-ROM drive or the floppy disk drive accommodated in the docking station.

Figure 9:
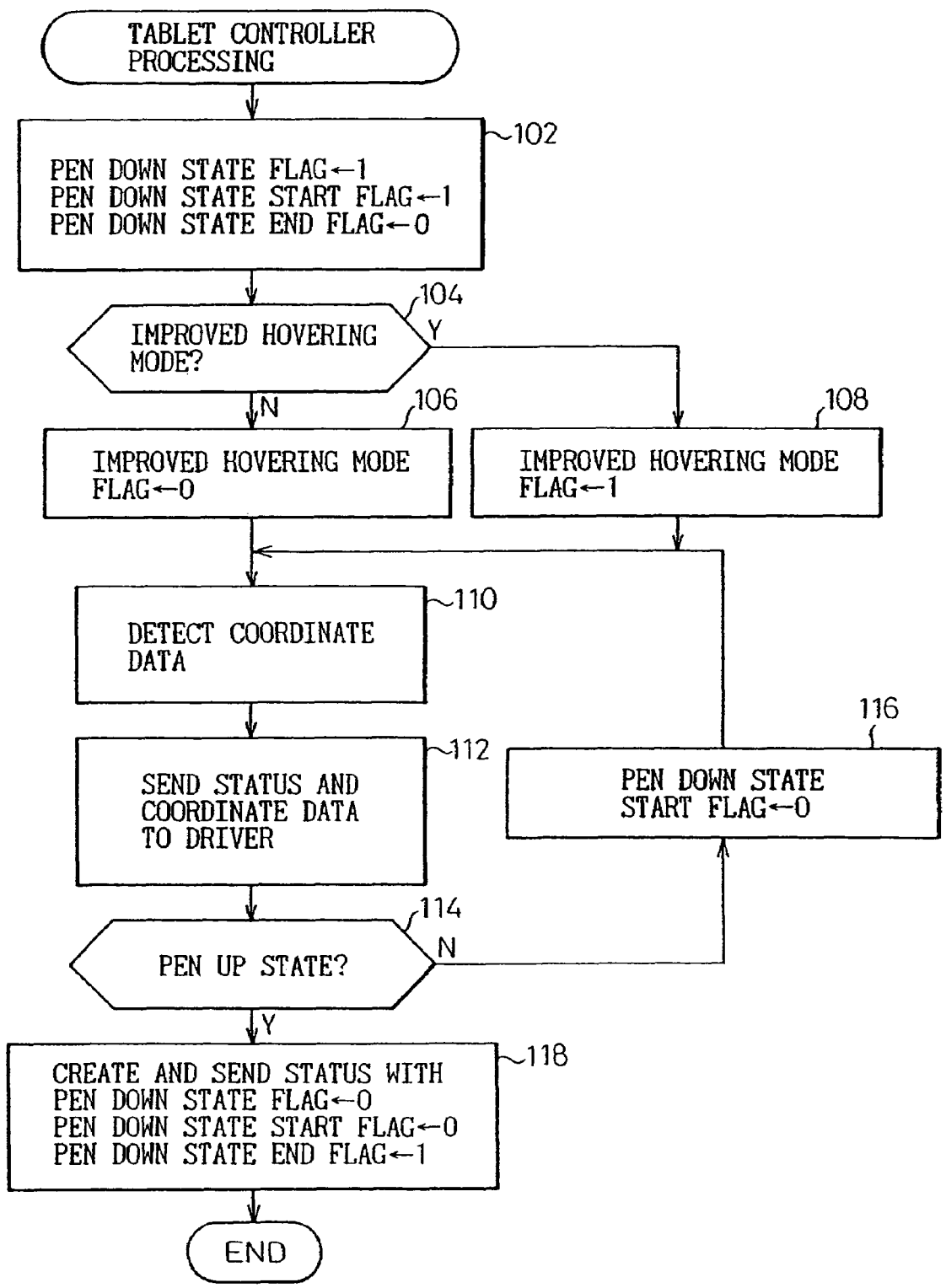
FIG. 9 is a flowchart illustrating the sequence of processing performed by a tablet controller.

FIG. 9 is a flowchart illustrating the sequence of processing that the CPU 52a within the tablet controller 52 performs in accordance with the program loaded into the memory 52b of the controller 52. This program is usually stored on the HDD 40, and is loaded into the memory of the tablet controller 52 at system power-up. The program may also be provided on other recording media such as a floppy disk or a CD-ROM. The illustrated process is invoked as an interrupt service routine when a pen down motion is performed on the tablet 10.

First, in step 102, upon detecting the pen down motion, a pen down state flag and a pen down state start flag are both set to 1, and a pen down state end flag is cleared to 0. The pen down state flag is a flag that is set to indicate that the current state is the pen down state, and the pen down state start flag is a flag that is set to 1 only once when a transition is made to the pen down state, while the pen down state end flag is a flag that is set to indicate the end of the pen down state. These flags are implemented in the memory 52b within the tablet controller 52. Next, in step 104, it is determined whether the current operation mode is the improved hovering mode or not, based on the operation performed on the hovering icon 22 on the hot pad 20. If the current mode is not the improved hovering mode, that is, if the current mode is the normal mode, the process proceeds to step 106; on the other hand, if the current mode is the improved hovering mode, the process proceeds to step 108.

In step 106, an improved hovering mode flag, a flag that is set to indicate the improved hovering mode, is cleared to 0, i.e., set OFF. On the other hand, in step 108, the improved hovering mode flag is set to 1, i.e., ON. The improved hovering mode flag also is implemented in the memory 52b within the tablet controller 52. In step 110, which follows step 106 or 108, coordinate data indicating the position at which the tablet 10 is pressed by the pen is detected. In the case of a pressure sensitive tablet, the coordinate data is detected by applying a voltage and measuring the resistance.

Figure 10:
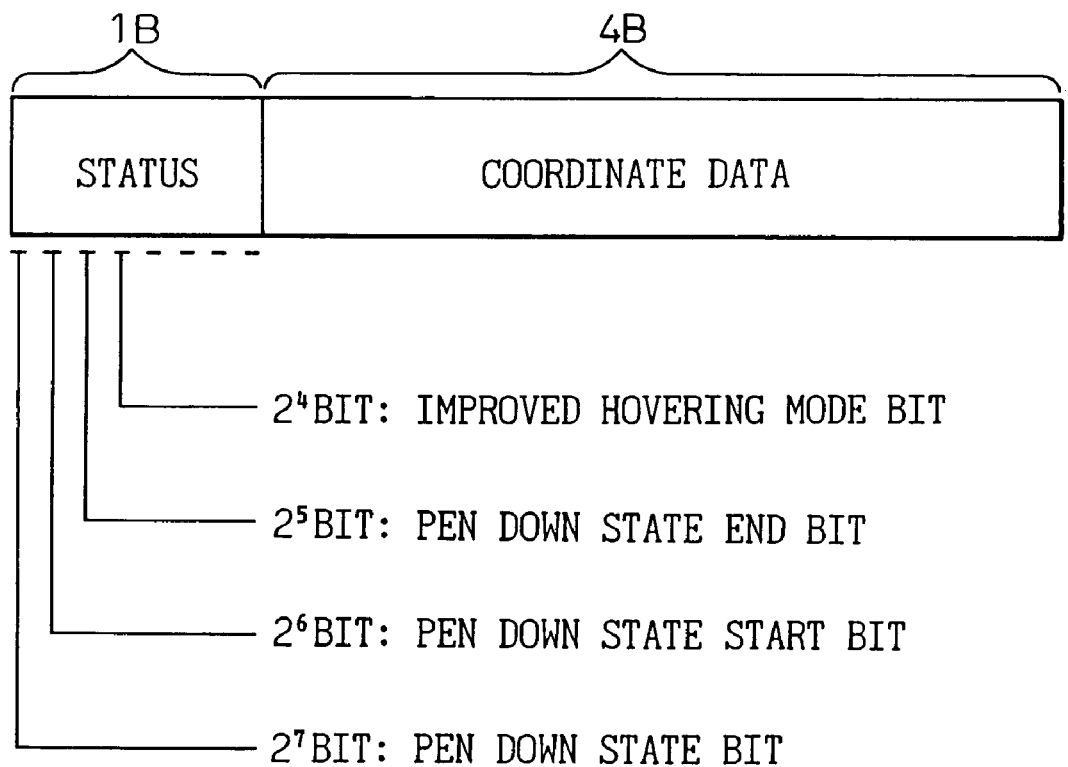
FIG. 10 is a diagram showing the format of data sent out from the tablet controller.

Next, in step 112, transmission data consisting of status (1 byte) and coordinate data (4 bytes), as shown in FIG. 10, is assembled in the memory 52b within the tablet controller 52, and is sent to the pen driver described later. The status byte contains a pen down state bit (pen down information), a pen down state start bit, a pen down state end bit, and an improved hovering mode bit, respectively indicating the values of the pen down state flag, pen down state start flag, pen down state end flag, and improved hovering mode flag.

In step 114, it is determined whether the current state is the pen up state, and if the state is not the pen up state, that is, if the state is still the pen down state, the process proceeds to step 116; on the other hand, if the state is the pen up state, the process proceeds to step 118. In step 116, the pen down state start flag is cleared to 0, and the process loops back to step 110. In step 118, on the other hand, the pen down state flag and the pen down state start flag are both cleared to 0, while setting the pen down state end flag to 1, and the status reflecting the contents of these flags is created and sent out.

In this way, during the period from the pen down to the pen up, data is sent out at predetermined intervals of time (for example, every 5 ms).

The state transitions of the flags in the improved hovering mode in the above-described process will be described with reference to FIG. 11. First, when the pen down motion is detected, the pen down state flag is set to 1, the pen down state start flag is set to 1, the pen down state end flag is cleared to 0, and the improved hovering mode flag is set to 1 in steps 102, 104, and 108, as shown in case (A) in FIG. 11. Then, these flag states are written in the status bits and sent out in step 112 together with the coordinate data detected in step 110.

As long as the pen down state continues, the process consisting of steps 114, 116, 110, and 112 is carried out in a loop fashion, as shown in case (B) in FIG. 11; during that period, the pen down state flag remains at 1, the pen down state start flag remains at 0, and the pen down state end flag remains at 0. During the loop process, the coordinate data is constantly updated in step 110, and the coordinate data and the status are sent out in step 112 at predetermined intervals of time.

When a pen up motion is detected to end the pen down state, the process proceeds from step 114 to step 118, and the pen down state flag and pen down state start flag are now at 0 and the pen down state end flag is set to 1, as shown in case (C) in FIG. 11. This forms the final status to be sent out. In the above process, if a pen up motion is detected immediately following the pen down motion, the flags make transitions from the states shown in case (A) in FIG. 11 directly to the states shown in case (C) in FIG. 11 without passing through the states shown in case (B) in FIG. 11.

Figure 12:
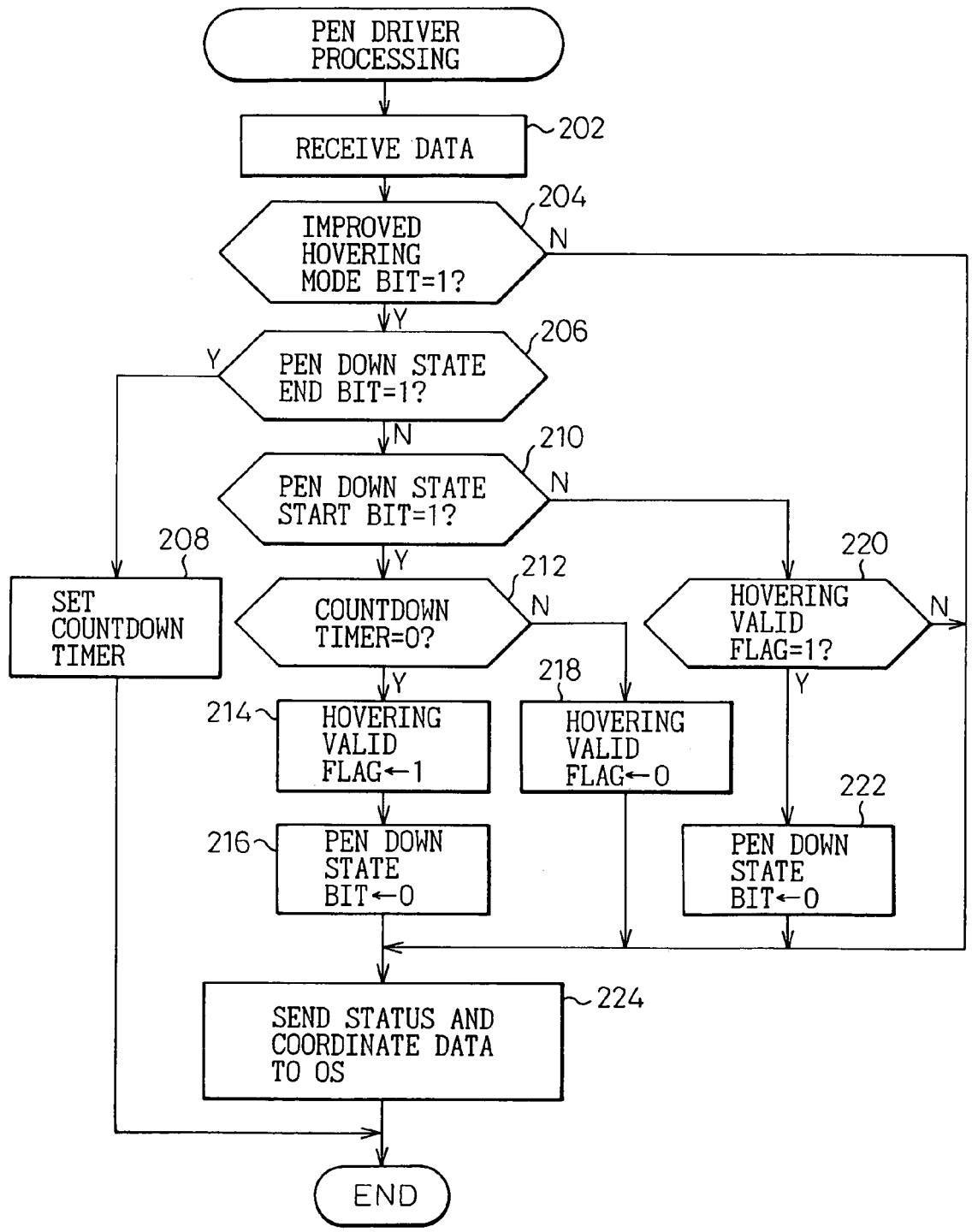
FIG. 12 is a flowchart illustrating a pen driver processing sequence.
Figure 16A:
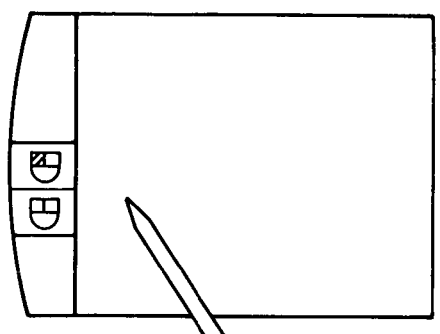
FIGS. 16A, 16B, 16C, and 16D are diagrams for explaining a method of operation mode switching according to the prior art.
Figure 16B:
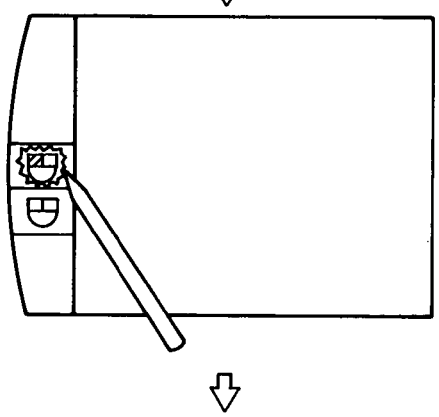
Figure 16C:
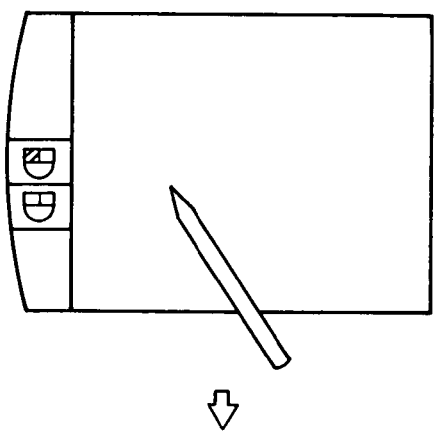
Figure 16D:
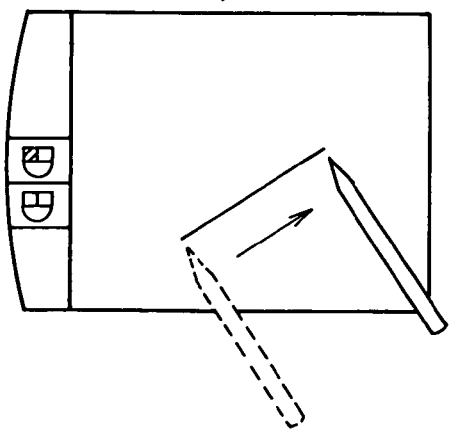

FIG. 12 is a flowchart illustrating a pen driver processing sequence carried out by the CPU 32a within the multichip module 32. This pen driver program is usually stored on the HDD 40, and is loaded into the SDRAM 34 at system power-up and executed on the SDRAM 34. The program may be provided on other storage media such as a floppy disk or a CD-ROM. The illustrated process is initiated upon detecting the arrival of data sent from the tablet controller 52. First, in step 202, the data (see FIG. 10) sent from the tablet controller 52 is received, and stored in a designated area within the SDRAM 34. Next, in step 204, the status in the received data is examined to determine whether the improved hovering mode bit is 1 or 0, and if the improved hovering mode bit is 1, the process proceeds to step 206; on the other hand, if the improved hovering mode bit is 0, the process proceeds to step 224.

In step 206, it is determined whether the pen down state end bit contained in the status byte in the received data is 1 or 0, and if the pen down state end bit is 1, the process proceeds to step 208; on the other hand, if the pen down state end bit is 0, the process proceeds to step 210. In step 208, the countdown timer is set and started, whereupon the routine is terminated. This countdown timer is provided to measure the time interval between a pen up motion and a pen down motion, thereby to determine whether or not the length of time of the pen up state is less than a predetermined threshold value. This timer is implemented as a software timer in the SDRAM 34.

In step 210, it is determined whether the pen down state start bit contained in the status is 1 or 0, and if the pen down state start bit is 1, the process proceeds to step 212; on the other hand, if the pen down state start bit is 0, the process proceeds to step 220. In step 212, the countdown timer is checked to determine whether the timer has counted down 0 or not, and if the timer has not yet counted down to 0, that is, if the length of time of the pen up state is shorter than the predetermined length of time, the process proceeds to step 214; on the other hand, if the timer has already counted down to 0, that is, if the length of time of the pen up state is longer than the predetermined length of time, the process proceeds to step 218.

In step 214, hovering valid flag is set to 1, and the process proceeds to step 216. This hovering valid flag is a flag that is set to indicate that the hovering operation is to be performed validly in the improved hovering mode as it is originally intended. The flag is implemented in the SDRAM 34. In step 216, the pen down state bit in the status is changed to 0, and the process proceeds to step 224. On the other hand, in step 218, the hovering valid flag is cleared to 0 to invalidate the hovering operation in the improved hovering mode as an exception and thereby to effect the normal mode; then, the process proceeds to step 224.

In step 220, which is carried out when the pen down state start bit is detected as being 0 in step 210, the hovering valid flag is checked to determine whether it is at 1 or 0, and if the hovering valid flag is at 1, the process proceeds to step 222; on the other hand, if the hovering valid flag is at 0, the process proceeds to step 224. In step 222, the pen down state bit in the status is changed to 0, and the process proceeds to step 224. In the final step 224, the coordinate data and the status containing the pen down state bit after completion of the above processing are sent to the operating system (OS).

As the result of the above pen driver processing, the pen down state bit (pen down information) in the status reported to the OS along with the coordinate data is as follows. When the mode is not the improved hovering mode, that is, when the mode is the normal mode, steps 202, 204, and 224 are carried out in sequence, so that the pen down state bit remains unchanged at 1 and is reported as is.

Pen driver operation in the improved hovering mode, on the other hand, will be described below with reference to FIG. 13. In the improved hovering mode, the operation differs depending on the time interval between the pen up motion and the pen down motion detected in the above process, that is, depending on whether or not the length of time of the pen up state is less than the threshold value set by the countdown timer.

First, since the pen down state end bit is 1 in the final status, that is, the status received when the pen down state has ended by detecting a pen up motion, the steps 202, 204, 206, and 208 are carried out, as shown in case (A) in FIG. 13, and the countdown timer is thus set and started to count the time until the next pen down motion is detected.

Then, when the next pen down occurs with the countdown timer already reaching 0, that is, when a pen down motion is detected after the predetermined time has elapsed from the preceding pen up motion, the first status received indicates that the pen down state bit is 1, the pen down state start bit is 1, and the pen down state end bit is 0, as shown in case (B) in FIG. 13, and at this time, the countdown timer is already at 0; accordingly, the steps 202, 204, 206, 210, 212, 214, 216, and 224 are carried out in sequence. In the process, the hovering valid flag is set to 1 in step 214. The pen down state bit is changed to 0 in step 216, and the change state bit is reported to the OS in step 224. In other words, the number of pen down motions performed within the predetermined time is detected using the countdown timer, and if it is determined in step 212 that the countdown timer reads 0, that means that the number of pen down motions (touch motions) occurring in succession within the predetermined time is 1; as a result, the pen down state bit is not set ON, and it is determined that the state is not the pen down state.

In intermediate status received during the pen down state following the states shown in case (B) in FIG. 13, the pen down state bit is 1, the pen down state start bit is 0, and the pen down end bit is 0, as shown in case (C) in FIG. 13 and, at this time, the hovering valid flag is at 1; accordingly, the steps 202, 204, 206, 210, 220, 222, and 224 are carried out in sequence. Here again, the pen down state bit is changed to 0 in step 222, and the changed state bit is reported to the OS in step 224.

On the other hand, when the next pen down occurs with the countdown timer yet to reach 0, that is, when a pen down motion is detected before the predetermined time has elapsed from the preceding pen up motion, the first status received indicates that the pen down state bit is 1, the pen down state start bit is 1, and the pen down state end bit is 0, as shown in case (D) in FIG. 13, and at this time, the countdown timer has not yet reached 0; accordingly, the steps 202, 204, 206, 210, 212, 218, and 224 are carried out in sequence. In the process, the hovering valid flag is cleared to 0 in step 218. The pen down state bit remains unchanged at 1 and is reported to the OS as it is. In other words, the number of pen down motions performed within the predetermined time is detected using the countdown timer, and if it is determined in step 212 that the countdown timer has not yet reached 0, that means that the number of pen down motions (touch motions) occurring in succession within the predetermined time is 2 or more; as a result, the pen down state bit is set ON accordingly, and it is determined that the state is the pen down state.

In intermediate status received during the pen down state following the states shown in case (D) in FIG. 13, the pen down state bit is 1, the pen down state start bit is 0, and the pen down state end bit is 0, as shown in case (E) in FIG. 13, and at this time, the hovering valid flag is at 0; accordingly, the steps 202, 204, 206, 210, 220, and 224 are carried out in sequence. As a result, the pen down state bit remains unchanged at 1, and is reported to the OS as it is.

Following the states shown in case (B), (C), (D), or (E) in FIG. 13, when the pen down states ends by detecting a pen up motion, and the final status is received, the countdown timer is started, as previously described, to prepare for the next pen down, as shown in case (A) in FIG. 13.

FIG. 14 is a flowchart illustrating the processing sequence of the OS during graphical input processing. This OS program is usually stored on the HDD 40, and is loaded into the SDRAM 34 at system power-up and executed on the SDRAM 34 by the CPU 32a within the multichip module 32. This OS program may be provided on other storage media such as a floppy disk or a CD-ROM. The illustrated process is initiated upon arrival of the data sent from the pen driver. First, in step 302, the data sent from the pen driver is received, and stored in a designated area within the SDRAM 34. Next, in step 304, it is determined whether the pen down state bit in the status is 1 or 0, and if the pen down state bit is 1, the process proceeds to step 306; on the other hand, if the pen down state bit is 0, the process proceeds to step 308.

In step 306, the cursor is moved while maintaining the pen down state which is equivalent to the state in which a mouse is clicked and held down. This causes a dot or line to be drawn, just as if a mouse was dragged. On the other hand, in step 308, the cursor is merely moved to the position indicated by the received coordinate data.

According to the above-described tablet controller, pen driver, and OS processing operations, by just performing an extra pen tap in the improved hovering mode, the immediately following pen tap works just like a pen tap performed in the normal mode. That is, supposing that the state shown in FIG. 15A is a state in the improved hovering mode, if a line drawing motion is performed on the tablet after performing a pen tap once, as shown in FIG. 15B, a line is drawn on the display as in the normal mode, as shown in FIG. 15C. After a series of drawing motions, a pen up state is entered, and after the elapse of a certain amount of time, the hovering operation is again enabled. In the prior art, the pen had to be moved outside the screen to switch the mode, as shown in FIGS. 16A, 16B, 16C, and 16D, but according to the present invention, a smooth operation becomes possible.

Pen motion and operation modes will be described in more detail when a line is drawn by temporarily entering the normal operation mode during the improved hovering mode and then resuming the hovering operation. In the present invention, immediately before drawing a line, a pen tap is performed to switch the operation, and immediately after that, a line is drawn; when the pen is lifted off the tablet after drawing the line, the hovering operation automatically resumes, as shown in FIG. 17. In the prior art method, on the other hand, at timing A before drawing a line, the appropriate button had to be pressed to switch to the normal mode, as shown in FIG. 18, and then at timing B after drawing the line, another button had to be pressed to switch back to the hovering mode. The present invention eliminates the need for such troublesome button operations.

Figure 19:
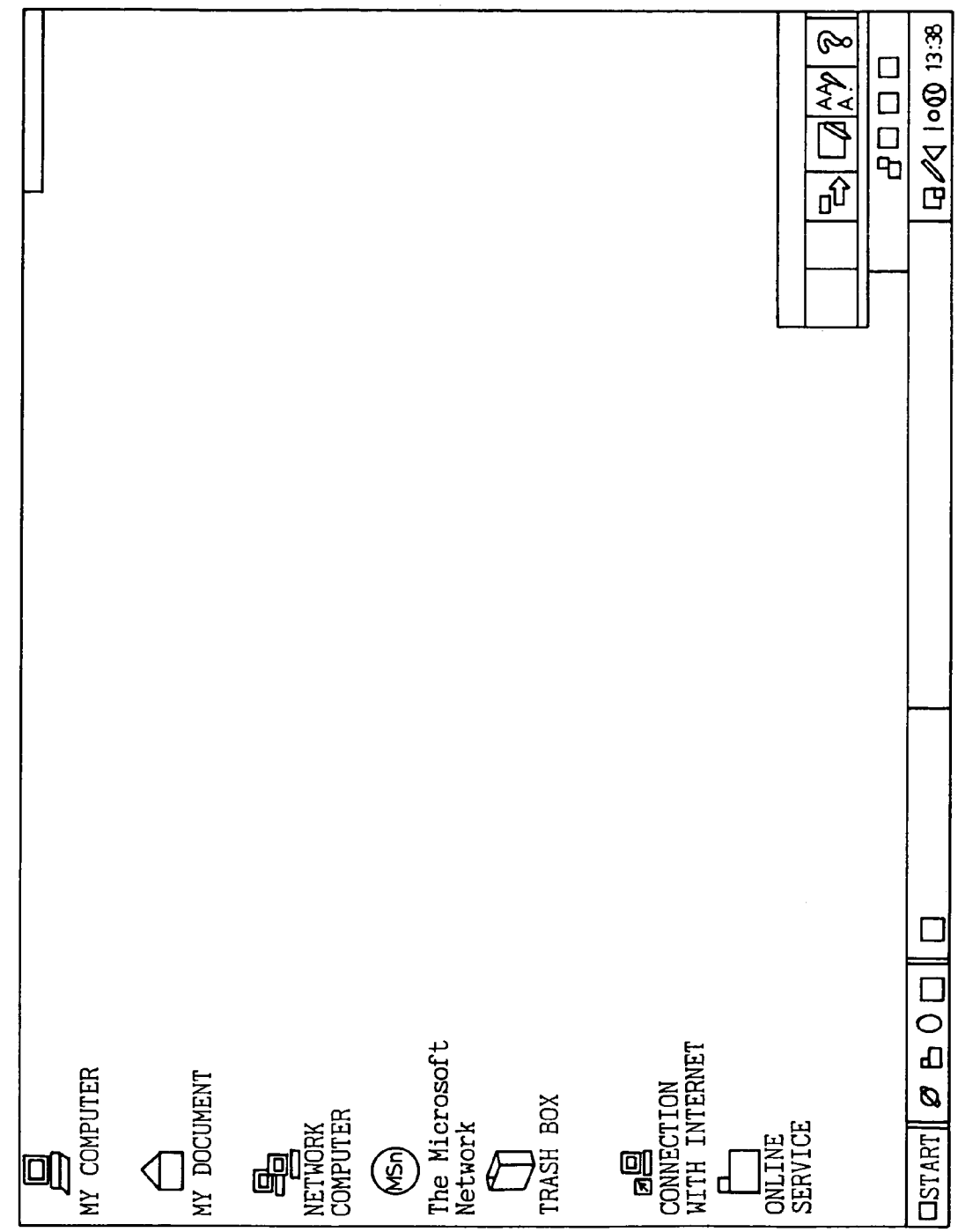
FIG. 19 is a diagram showing an example of an icon manipulation screen.

Next, a description will be given of icon manipulations in the improved hovering mode according to the present invention. Suppose an icon manipulation screen such as shown in FIG. 19 is used in the improved hovering mode. In this case also, by just performing an extra pen tap, the immediately following pen tap works just like a pen tap performed in the normal mode. More specifically, since the first tap is used for operation switching, the equivalent of a single click of a mouse is accomplished by a double tap of the pen, and the equivalent of a double click of a mouse is accomplished by a triple tap of the pen.

Figure 20A:
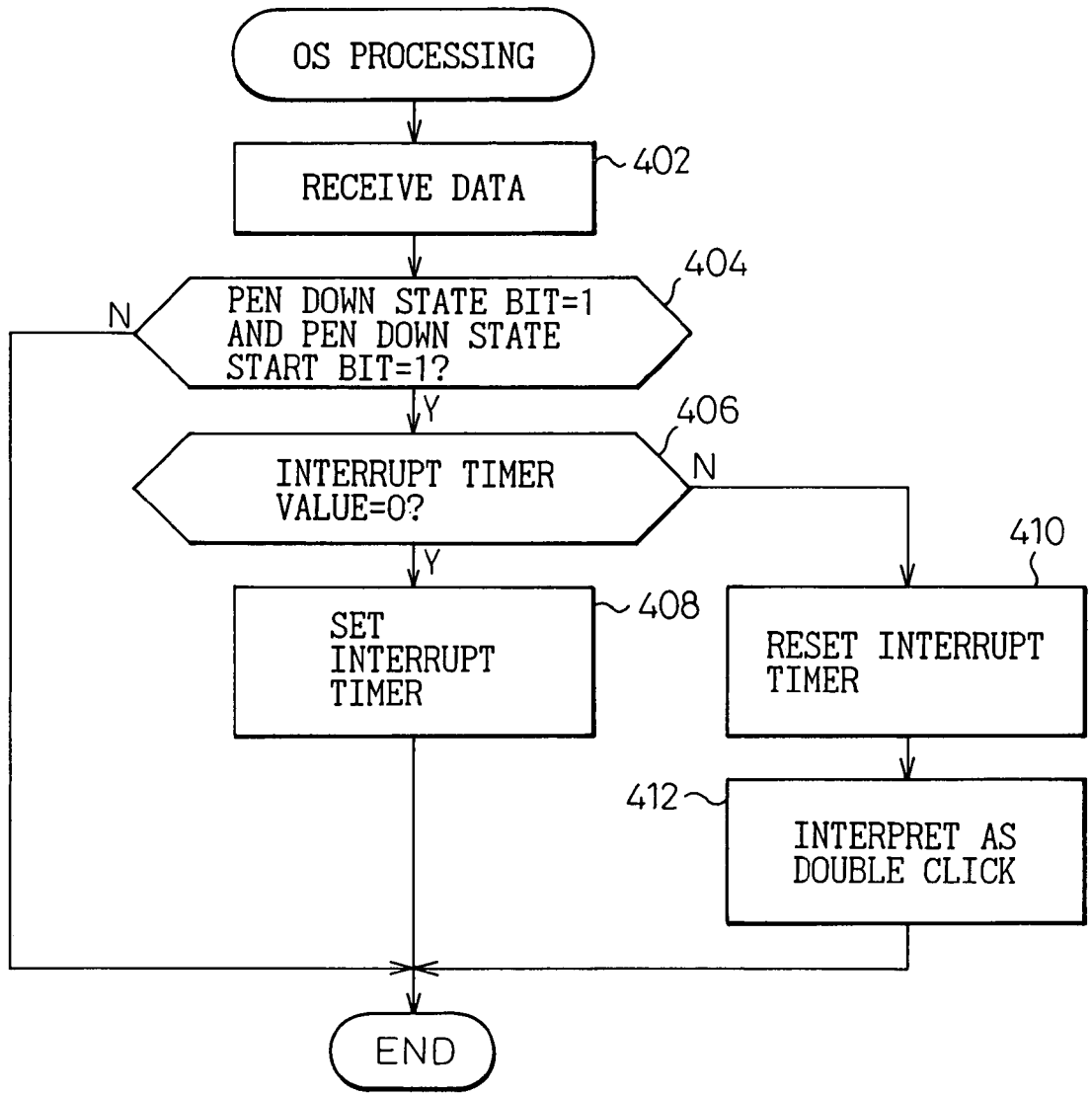
FIGS. 20A and 20B are flowcharts illustrating a processing sequence of an OS during an icon manipulation.
Figure 20B:
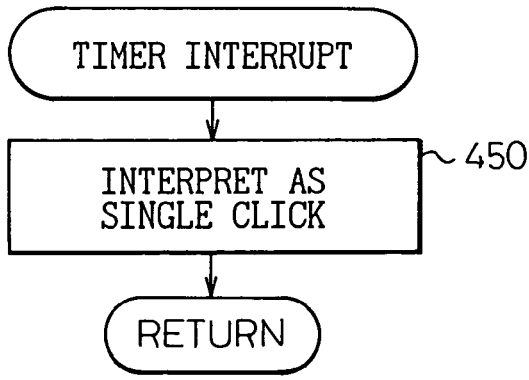

FIGS. 20A and 20B are flowcharts illustrating the processing sequence of the OS during an icon manipulation. This OS program is usually stored on the HDD 40, and is loaded into the SDRAM 34 at system power-up and executed on the SDRAM 34 by the CPU 32a within the multichip module 32. This OS program may be provided on other storage media such as a floppy disk or a CD-ROM. The illustrated process is initiated upon arrival of the data sent from the pen driver. As earlier described, for successively occurring pen taps, the pen driver sets the pen down state bit to 1 for the second and later taps, and sends this bit state to the OS. Accordingly, the OS interprets the second tap as the first mouse click.

First, in step 402, the data sent from the pen driver is received, and stored in a designated area within the SDRAM 34. Next, in step 404, it is determined whether the pen down state bit and pen down state start bit in the status are both 1 or not, and if the result is YES, the process proceeds to step 406; on the other hand, if the result is NO, the routine is terminated.

In step 406, it is determined whether an interrupt timer value, which will be set in the following step 408, is 0 or not, and if the timer value is 0, the process proceeds to step 408; on the other hand, if the timer value is not 0, the process proceeds to step 410. In step 408, the interrupt timer is set, and the routine is terminated. In step 410, on the other hand, it is decided that the next pen down has occurred within the predetermined time from the previous pen down, and the interrupt timer is reset. In the next step 412, it is determined that a double click has occurred.

When an interrupt is caused by the interrupt timer set in step 408, the process shown in FIG. 20B is carried out. Since this process is invoked when the next pen down did not occur within the predetermined time from the previous pen down, it is determined in step 450 that a single click has occurred.

When a single click is detected, a file selection or other operation is performed, and when a double click is detected, a program in the file is activated, for example.

As described above, according to the present invention, in an information processing apparatus that uses a touch input device such as a tablet or digitizer instead of a mouse as an input device, switching between normal operation and hovering operation can be accomplished with a very simple operation, enhancing its usability. Though the embodiment has been described by dealing with an example that uses a pen (or stylus), the present invention is also applicable to an apparatus that is operated by a finger.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An input processing method for a device which provides input by performing a touch motion on an operating surface, comprising;
   a first step of detecting the number of successive occurrences of said touch motion; and
   a second step of determining information indicating a touch state in accordance with said detected number of occurrences,
   wherein when said number of occurrences is 1, said second step determines that the state is not the touch state occurring in relation to said touch motion, and when said detected number of occurrences is 2 or more, then determines that the state is the touch state.

2. An input processing method for a device which provides input by performing a touch motion on an operating surface, comprising:
   a first step of detecting the number of successive occurrences of said touch motion; and
   a second step of determining information indicating a touch state in accordance with said detected number of occurrences,
   wherein when said detected number of occurrences is 2, it is determined that a single click has occurred, and/or when said detected number of occurrences is 3, it is determined that a double click has occurred.

3. An input processing method for a device which provides input by performing a touch motion on an operating surface, comprising:
   a first step of detecting the length of time of a non-touch state in which no touch motion is performed on said operating surface; and
   a second step of determining information indicating a touch state in accordance with said detected length of time when a touch motion has occurred, wherein
   said device is a device that displays a cursor in a display section, receives a double tap as an equivalent of a single click of a mouse, and receives a triple tap as an equivalent of a double click of a mouse, said cursor has a first state for directing the processing of a manipulation target displayed in said display section, and a second state for not directing the processing of said manipulation target, and there is included a step in which said cursor changes from said second state to said first state in response to said touch state indicating information.

4. An input processing method as claimed in claim 3, wherein said first state is a cursor-clicked state, and/or said second state is a hovering state.

5. An input processing method for a device which provides input by performing a touch motion on an operating surface, comprising:

a first step of detecting the length of time of a non-touch state in which no touch motion is performed on said operating surface; and a second step of determining information indicating a touch state in accordance with said detected length of time when a touch motion has occurred, wherein said device is a device that displays a cursor in a display section, receives a double tap as an equivalent of a single click of a mouse, and receives a triple tap as an equivalent of a double click of a mouse, said cursor has a first state for directing the processing of a manipulation target displayed in said display section, and a second state for not directing the processing of said manipulation target, and there is included a step in which said cursor changes from said first state to said second state when said touch motion has ended.

6. An input processing method for a device which provides input by performing a touch motion on an operating surface, comprising the steps of:

detecting the number of successive occurrences of said touch motion; and determining a corresponding mouse operation in accordance with said detected number of occurrences, wherein said corresponding mouse operation determining step determines that a single click has occurred when said detected number of occurrences is 2, and/or determines that a double click has occurred when said detected number of occurrences is 3.

7. An input control apparatus for a device which provides input by performing a touch motion on an operating surface, comprising:

a first unit detecting the number of successive occurrences of said touch motion; and a second unit determining information indicating a touch state in accordance with said detected number of occurrences, wherein when said number of occurrences is 1, said second unit determines that the state is not the touch state occurring in relation to said touch motion, and when said detected number of occurrences is 2 or more, then determines that the state is the touch state.

8. An input control apparatus for a device which provides input by performing a touch motion on an operating surface, comprising a first unit detecting the number of successive occurrences of said touch motion; and a second unit determining information indicating a touch state in accordance with said detected number of occurrences, wherein when said detected number of occurrences is 2, it is determined that a single click has occurred, and/or when said detected number of occurrences is 3, it is determined that a double click has occurred.

9. An input control apparatus for a touch input device which provides input by performing a touch motion on an operating surface, comprising:

a first unit detecting the length of time of a non-touch state in which no touch motion is performed on said operating surface; and a second unit determining information indicating a touch state in accordance with said detected length of time when a touch motion has occurred, wherein said device is a device that displays a cursor in a display section, receives a double tap as an equivalent of a single click of a mouse, and receives a triple tap as an equivalent of a double click of a mouse, said cursor has a first state for directing the processing of a manipulation target displayed in said display section, and a second state for not directing the processing of said manipulation target, and there is included a unit for changing said cursor from said second state to said first state in response to said touch state indicating information.

10. An input control apparatus as claimed in claim 9, wherein said first state is a cursor-clicked state, and/or said second state is a hovering state.

11. An input control apparatus for a touch input device which provides input by performing a touch motion on an operating surface, comprising.

a first unit detecting the length of time of a non-touch state in which no touch motion is performed on said operating surface; and a second unit determining information indicating a touch state in accordance with said detected length of time when a touch motion has occurred, wherein said device is a device that displays a cursor in a display section, receives a double tap as an equivalent of a single click of a mouse, and receives a triple tap as an equivalent of a double click of a mouse, said cursor has a first state for directing the processing of a manipulation target displayed in said display section, and a second state for not directing the processing of said manipulation target, and there is included a unit changing said cursor from said first state to said second state when said touch motion has ended.

12. An input control apparatus for a device which provides input by performing a touch motion on an operating surface, comprising:

a unit detecting the number of successive occurrences of said touch motion; and a unit determining a corresponding mouse operation in accordance with said detected number of occurrences, wherein said corresponding mouse operation determining unit determines that a single click has occurred when said detected number of occurrences is 2, and/or determines that a double click has occurred when said detected number of occurrences is 3.

13. A recording medium readable by a computer, said computer using a device which provides input by performing a touch motion on an operating surface, said recording medium having a program recorded thereon for causing said computer to implement:

a first function detecting the number of successive occurrences of said touch motion; and a second function for determining information indicating a touch state in accordance with said detected number of occurrences, wherein when said number of occurrences is 1, said second function determines that the state is not the touch state occurring in relation to said touch motion, and when said detected number of occurrences is 2 or more, then determines that the state is the touch state.

14. A recording medium readable by a computer, said computer using a device which provides input by performing a touch motion on an operating surface, said recording medium having a program recorded thereon for causing said computer to implement:
a first function detecting the number of successive occurrences of said touch motion; and
a second function for determining information indicating a touch state in accordance with said detected number of occurrences, including a function for causing said computer to determine that a single click has occurred when said detected number of occurrences is 2, and/or a function for causing said computer to determine that a double click has occurred when said detected number of occurrences is 3.

15. A recording medium readable by a computer, said computer using a device which provides input by performing a touch motion on an operating surface, said recording medium having a program recorded thereon for causing said computer to implement:
a first function detecting the length of time of a non-touch state in which no touch motion is performed on said operating surface; and
a second function determining information indicating a touch state in accordance with said detected length of time when a touch motion has occurred, wherein
said device is a device that displays a cursor in a display section, receives a double tap as an equivalent of a single click of a mouse, and receives a triple tap as an equivalent of a double click of a mouse,
said cursor having a first state for directing the processing of a manipulation target displayed in said display section, and a second state for not directing the processing of said manipulation target, and
there is included a function changing said cursor from said second state to said first state in response to said touch state indicating information.

16. A recording medium as claimed in claim 15, wherein said first state is a cursor-clicked state, and/or said second state is a hovering state.

17. A recording medium readable by a computer, said computer using a device which provides input by performing a touch motion on an operating surface, said recording medium having a program recorded thereon for causing said computer to implement:
a first function detecting the length of time of a non-touch state in which no touch motion is performed on said operating surface; and
a second function determining information indicating a touch state in accordance with said detected length of time when a touch motion has occurred, wherein
said device is a device that displays a cursor in a display section, receives a double tap as an equivalent of a single click of a mouse, and receives a triple tap as an equivalent of a double click of a mouse,
said cursor has a first state for directing the processing of a manipulation target displayed in said display section, and a second state for not directing the processing of said manipulation target, and
there is included a function for changing said cursor from said first state to said second state when said touch motion has ended.

18. A recording medium readable by a computer, said computer using a device which provides input by performing a touch motion on an operating surface, said recording medium having a program recorded thereon for causing said computer to implement:
a function detecting the number of successive occurrences of said touch motion; and
a function determining a corresponding mouse operation in accordance with said detected number of occurrences, wherein said corresponding mouse operation determining function determines that a single click has occurred when said detected number of occurrences is 2, and/or determines that a double click has occurred when said detected number of occurrences is 3.

19. An input processing method for a device which provides input by performing a touch motion on an operating surface, comprising:
a first step of detecting the number of successive occurrences of said touch motion; and
a second step of determining information indicating a touch state in accordance with said detected number of occurrences,
wherein said first step detects the number of occurrences of said touch motion over a predetermined length of time,
and wherein when said number of occurrences is 1, said second step determines that the state is not the touch state occurring in relation to said touch motion, and when said detected number of occurrences is 2 or more, then determines that the state is the touch state.

20. An input processing method for a device which provides input by performing a touch motion on an operating surface, comprising:
a first step of detecting the number of occurrences of said touch motion over a predetermined length of time; and
a second step of determining information indicating a touch state in accordance with said detected number of occurrences,
wherein when said number of occurrences is 1, said second step determines that the state is not the touch state occurring in relation to said touch motion, and when said detected number of occurrences is 2 or more, then determines that the state is the touch state.

21. An input processing method for a device which provides input by performing a touch motion on an operating surface, comprising:
a first step of detecting the number of successive occurrences of said touch motion; and
a second step of determining information indicating a touch state in accordance with said detected number of occurrences,
wherein said first step detects the number of occurrences of said touch motion over a predetermined length of time,
and wherein when said detected number of occurrences is 2, it is determined that a single click has occurred, and/or when said detected number of occurrences is 3, it is determined that a double click has occurred.

22. An input processing method for a device which provides input by performing a touch motion on an operating surface, comprising:
a first step of detecting the number of occurrences of said touch motion over a predetermined length of time; and
a second step of determining information indicating a touch state in accordance with said detected number of occurrences,
wherein when said detected number of occurrences is 2, it is determined that a single click has occurred, and/or when said detected number of occurrences is 3, it is determined that a double click has occurred.

23. An input control apparatus for a device which provides input by performing a touch motion on an operating surface, comprising:
 a first unit detecting the number of successive occurrences of said touch motion; and
 a second unit detecting information indicating a touch state in accordance with said detected number of occurrences,
 wherein said first unit detects the number of occurrences of said touch motion over a predetermined length of time,
 and wherein when said number of occurrences is 1, said second unit determines that the state is not the touch state occurring in relation to said touch motion, and when said detected number of occurrences is 2 or more, then determines that the state is the touch state.

24. An input control apparatus for a device which provides input by performing a touch motion on an operation surface, comprising:
 a first unit detecting the number of occurrences of said touch motion over a predetermined length of time; and
 a second unit determining information indicating a touch state in accordance with said detected number of occurrences,
 wherein when said number of occurrences is 1, said second unit determines that the state is not the touch state occurring in relation to said touch motion, and when said detected number of occurrences is 2 or more, then determines that the state is the touch state.

25. A recording medium readable by a computer, said computer using a device which provides input by performing a touch motion on an operating surface, said recording medium having a program recorded thereon for causing said computer to implement:
 a first function detecting the number of successive occurrences of said touch motion; and
 a second function for determining information indicating a touch state in accordance with said detected number of occurrences,
 wherein said first function detects the number of occurrences of said touch motion over a predetermined length of time,
 and wherein when said number of occurrences is 1, said second function determines that the state is not the touch state occurrences in relation to said touch motion, and when said detected number of occurrences is 2 or more, then determines that the state is the touch state.

26. A recording medium readable by a computer, said computer using a device which provides input by performing a touch motion on an operating surface, said recording medium having a program recorded thereon for causing said computer to implement:
 a first function detecting the number of occurrences of said touch motion over a predetermined length of time; and
 a second function determining information indicating a touch state in accordance with said detected number of occurrences,
 wherein when said number of occurrences is 1, said second function determines that the state is not the touch state occurring in relation to said touch motion, and when said detected number of occurrences is 2 or more, then determines that the state is the touch state.

* * * * *